US005774365A

United States Patent [19]

Ladue et al.

[11] Patent Number: 5,774,365

[45] Date of Patent: Jun. 30, 1998

[54] DOCUMENT DISPENSER OPERATOR SECURITY

[75] Inventors: Philip G. Ladue, Bellbrook; Lance E. Kelley, Springfield; John H. King, Kettering; William V. Harrison, Beavercreek, all of Ohio

[73] Assignee: The Standard Register Company, Dayton, Ohio

[21] Appl. No.: 637,129

[22] Filed: Apr. 24, 1996

[51] Int. Cl.$^6$ .................................... G06F 17/60

[52] U.S. Cl. .................... 364/479.07; 235/375; 235/382; 340/825.31; 340/825.35; 364/479.01

[58] Field of Search .................................... 235/375, 379, 235/381, 382; 340/825.31, 825.34, 825.35; 364/479.01, 479.07

[56] References Cited

U.S. PATENT DOCUMENTS

| | | | |
|---|---|---|---|
| 3,795,417 | 3/1974 | Cohen | 292/144 |
| 3,826,344 | 7/1974 | Wahlberg | 194/2 |
| 4,177,657 | 12/1979 | Aydin | 70/278 |
| 4,355,369 | 10/1982 | Garvin | 235/379 X |
| 4,411,144 | 10/1983 | Aydin | 70/278 |
| 4,512,453 | 4/1985 | Schuller et al. | 194/200 |
| 4,532,416 | 7/1985 | Berstein | 235/379 |
| 4,534,194 | 8/1985 | Aydin | 70/278 |
| 4,625,275 | 11/1986 | Smith | 235/379 X |
| 4,629,871 | 12/1986 | Scribner et al. | 235/375 |
| 4,812,994 | 3/1989 | Taylor et al. | 364/464.2 |
| 4,870,596 | 9/1989 | Smith | 235/379 X |
| 4,947,163 | 8/1990 | Henderson et al. | 340/825.31 |
| 4,988,987 | 1/1991 | Barrett et al. | 340/825.31 |
| 5,216,706 | 6/1993 | Nakajima | 379/100 |
| 5,321,242 | 6/1994 | Heath, Jr. | 235/382 |
| 5,411,436 | 5/1995 | Kaplan | 453/17 |
| 5,451,757 | 9/1995 | Heath, Jr. | 235/382 |
| 5,508,933 | 4/1996 | Abumehdi | 364/464.18 |

*Primary Examiner*—Edward R. Cosimano
*Attorney, Agent, or Firm*—Killworth, Gottman, Hagan & Schaeff, L.L.P.

[57] ABSTRACT

A document dispenser incorporating multiple security levels of operation wherein dispenser operation in the operator mode is permitted when a valid operator passcode is entered at a passcode entry device, and wherein operation in the executive mode is permitted when the presence of a valid transportable security key is detected by a security key receiver.

16 Claims, 3 Drawing Sheets

DOCUMENT DISPENSER OPERATOR SECURITY

BACKGROUND OF THE INVENTION

The present invention relates to document dispensers incorporating multiple levels of operation, access to which is controlled in accordance with predetermined security limits.

In prior art document dispensing systems, certain modes of operation may be accessed only upon entry of predetermined security codes on a system keyboard. For example, an operator mode and an executive mode may be established and entry of predetermined passcodes may be required for operation in each mode. The operator mode, accessible only upon entry of an operator passcode, may be utilized to designate specific information to be printed on the documents and to dispense the documents. The executive mode, accessible only upon entry of an executive passcode, may be used to specify how the dispenser will operate, e.g., setting passwords, clearing system memory, selecting output types for document formats, printing document samples, setting various dispensing maximums, etc.

With such a prior art dispensing system, when an executive passcode is communicated to a dispenser operator, that operator may enter the executive mode whenever he chooses and is therefore effectively granted executive authority until the executive passcode is changed. Similarly, once the executive passcode is communicated to more than one or two individuals, it is often difficult to monitor who has knowledge of an executive passcode because the passcode can be easily communicated to non-executive personnel. Thus, with document dispensers utilizing executive passcodes entered on a keypad, it is not convenient to grant temporary access to an executive mode because to do so would compromise dispenser security, and require frequent changing of the executive passcode.

Document dispensers are commonly utilized to issue financial documents, e.g., cashier's checks, money orders, personal checks, business checks, gift certificates, etc. As a consequence, it is possible that an emergency situation could arise where an executive operator of a financial document dispenser is coerced to enter the executive mode and alter or disable certain dispenser security features. If an executive passcode must be entered on the dispenser keypad, the executive may be unable to remember the passcode because of the coercive context of the demand. An inability to remember a passcode in this situation is likely to have undesirable results. Similarly, because an executive passcode is often merely retained in the memory of an executive, it is possible to forget the passcode and be inhibited from future entry into the executive mode.

Accordingly, there is a need for a document dispenser incorporating multiple security levels of operation wherein executive authority can be temporarily granted to non-executive personnel and conveniently revoked. Further, there is a need for a document dispenser incorporating multiple security levels of operation wherein executive authority can be effectively regulated and monitored. Finally, there is a need for a document dispenser incorporating multiple security levels of operation wherein entry to an executive mode of operation is not dependent upon the numerical memory capabilities of a particular executive.

SUMMARY OF THE INVENTION

These needs are met by providing a document dispenser wherein dispenser operation in the operator mode is permitted when a valid operator passcode is entered at a passcode entry device, and wherein operation in the executive mode is permitted when a valid transportable security key is detected by a security key receiver.

In accordance with one embodiment the present invention, a document dispenser is provided comprising: a dispenser controller programmed to control the operation of the document dispenser; a document printer, a document data input device, and a passcode entry device in communication with the dispenser controller; a security key receiver in communication with the dispenser controller and arranged to detect the presence of a valid transportable security key; and, a security controller in communication with the dispenser controller, arranged to permit dispenser operation in a first security level when a valid passcode is entered at the passcode entry device, and arranged to permit dispenser operation in a second security level when a valid transportable security key is detected by the security key receiver.

The document data input device may comprise a dispenser keyboard or a data input port. The passcode entry device may comprise a keyboard, a keypad, or a decoder arranged to receive the valid passcode.

The transportable security key may comprise a mechanical key, and the security key receiver may comprise a lock arrangement defining a key slot or key hole. Alternatively, the transportable security key may comprise a magnetically, electrically, optically, or mechanically encoded object and the security key receiver comprises an object reader or scanner. Additionally, the transportable security key may comprise an electromagnetic radiation source in either the visible or invisible portion of the spectrum, and the security key receiver may comprise a radiation detector. The at least one security key receiver may comprise a first security key receiver and a second security key receiver, and the first security key receiver may be coupled to an access panel opening and closing mechanism of said printer.

In accordance with another embodiment of the present invention, a document dispenser is provided comprising a dispenser controller programmed to control the operation of the document dispenser, a document printer in communication with the dispenser controller, a document data input device in communication with the dispenser controller, a passcode entry device in communication with the dispenser controller, a first security key receiver in communication with the dispenser controller and arranged to detect the presence of a first transportable security key, a second security key receiver in communication with the dispenser controller and arranged to detect the presence of a second transportable security key, a security controller in communication with the dispenser controller, arranged to permit dispenser operation in a first security level when a valid passcode is entered at the passcode entry device, arranged to permit dispenser operation in a second security level when a first transportable security key is detected by the security key receiver, and arranged to permit dispenser operation in a third security level when a second transportable security key is detected by the security key receiver. The first security key receiver may be coupled to an access panel opening and closing mechanism of said printer.

In accordance with yet another embodiment of the present invention, a method of dispensing documents comprises the steps of providing a dispenser controller programmed to control the operation of a document printer and a document data input device, permitting dispenser operation in a first security level when a valid passcode is entered at a passcode entry device, and permitting dispenser operation in a second security level when a valid transportable security key is detected by a security key receiver.

In accordance with yet another embodiment of the present invention, a document dispenser is provided comprising: means for controlling the operation of a document printer and a document data input device; means for permitting operation of the document printer and the document data input device in a first security level when a valid passcode is entered at a passcode entry device, and permitting operation of the document printer and the document data input device in a second security level when a first valid transportable security key is detected by a first security key receiver. The document dispenser may further comprise means for permitting operation of the document printer and the document data input device in a third security level when a second valid transportable security key is detected by a second security key receiver.

Accordingly, it is an object of the present invention to provide a document dispenser incorporating multiple security levels of operation wherein executive authority can be temporarily granted by transferring possession of a transportable security key to non-executive personnel and conveniently revoked by repossessing the transportable security key. Further, a document dispenser incorporating multiple security levels of operation is provided wherein entry to an executive mode of operation is dependent on possession of a valid tangible transportable security key, and not dependent upon the numerical memory capabilities of a particular executive. Finally, a document dispenser incorporating multiple security levels of operation is provided wherein executive authority can be effectively regulated and monitored by monitoring the possession of a specific transportable security key or a limited number of transportable security keys.

DETAILED DESCRIPTION OF THE INVENTION

Figure 1:
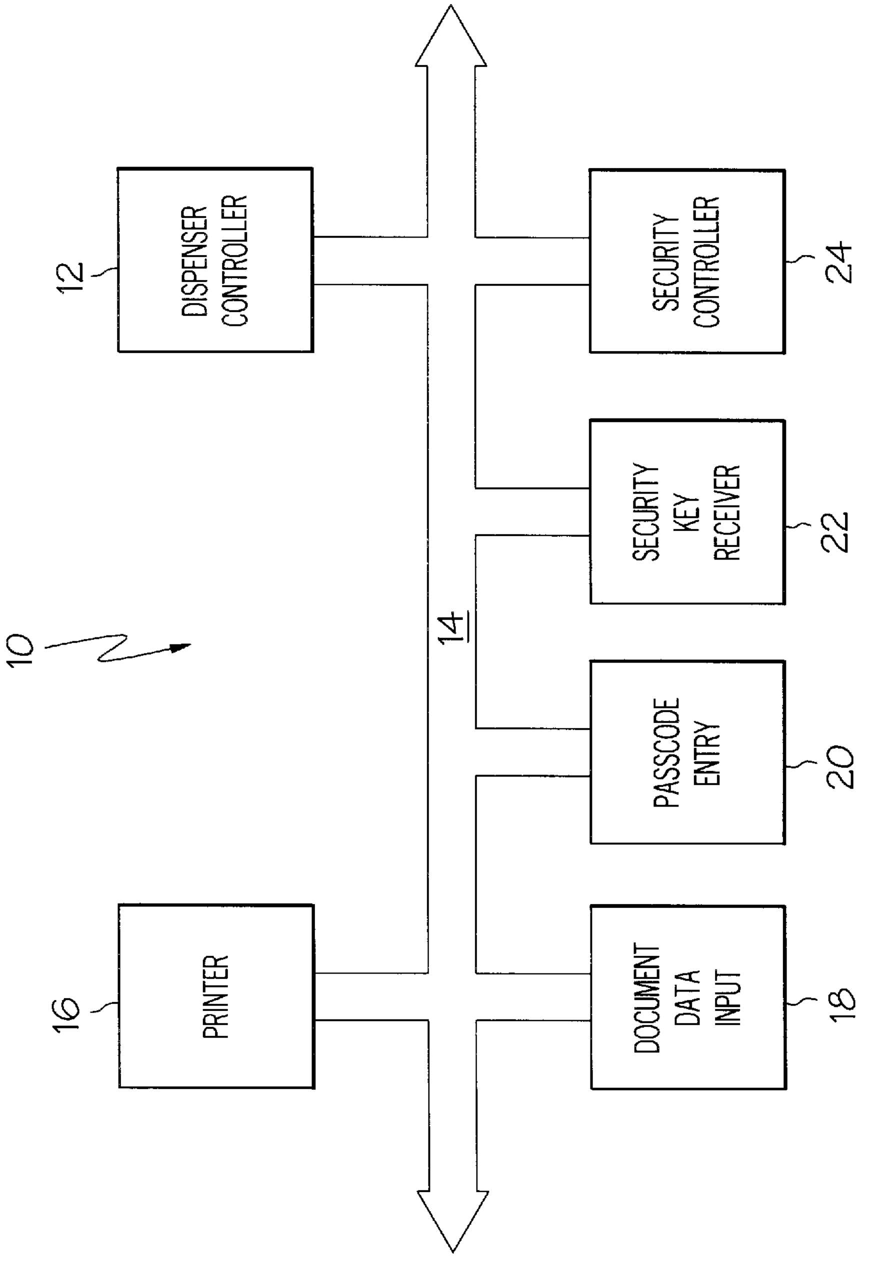
FIG. 1 is a block diagram illustrating the components of a document dispenser in accordance with the present invention.

FIG. 1 illustrates the electronic components of the document dispenser 10. The overall operation of the dispenser 10 is controlled by a dispenser controller 12. The dispenser controller 12 typically includes a central processing unit, a digital program data storage device for providing storage of various operating and applications programs, and a digital data storage device for providing storage of data processed by the controller 12. Data, address, and control buses, represented generally by the bus 14 are provided to facilitate communication between various components of the dispenser 10, as described below. It is contemplated by the present invention that the program storage device and the data storage device may comprise a single digital data storage device.

A document printer 16, a document data input device 18, a passcode entry device 20, a security key receiver 22, and a security controller 24 are connected to the dispenser controller 12 and are controlled thereby according to the various operating and applications programs resident therein. The document printer 16 is preferably integrally formed within the body of the dispenser 10. However, it is contemplated by the present invention that the document dispenser may be designed to have the capability of printing to a peripheral printer.

The document data input device 18 typically comprises a data communications port, a keypad, or a keyboard. A dispenser operator enters control data at the document data input device 18 in order to operate the dispenser 10 according to the operations programs resident therein. Additionally, the dispenser operator selects a set of document variable values according to the requirements of a particular document to be dispensed and enters the selected values at the data input device 18. For example, in the event the document dispenser is utilized primarily to dispense money orders, the operator will typically select a money order amount, a payor name, a payee name, a document date, etc. The selected values are then entered at the document data input device 18.

Figure 3:
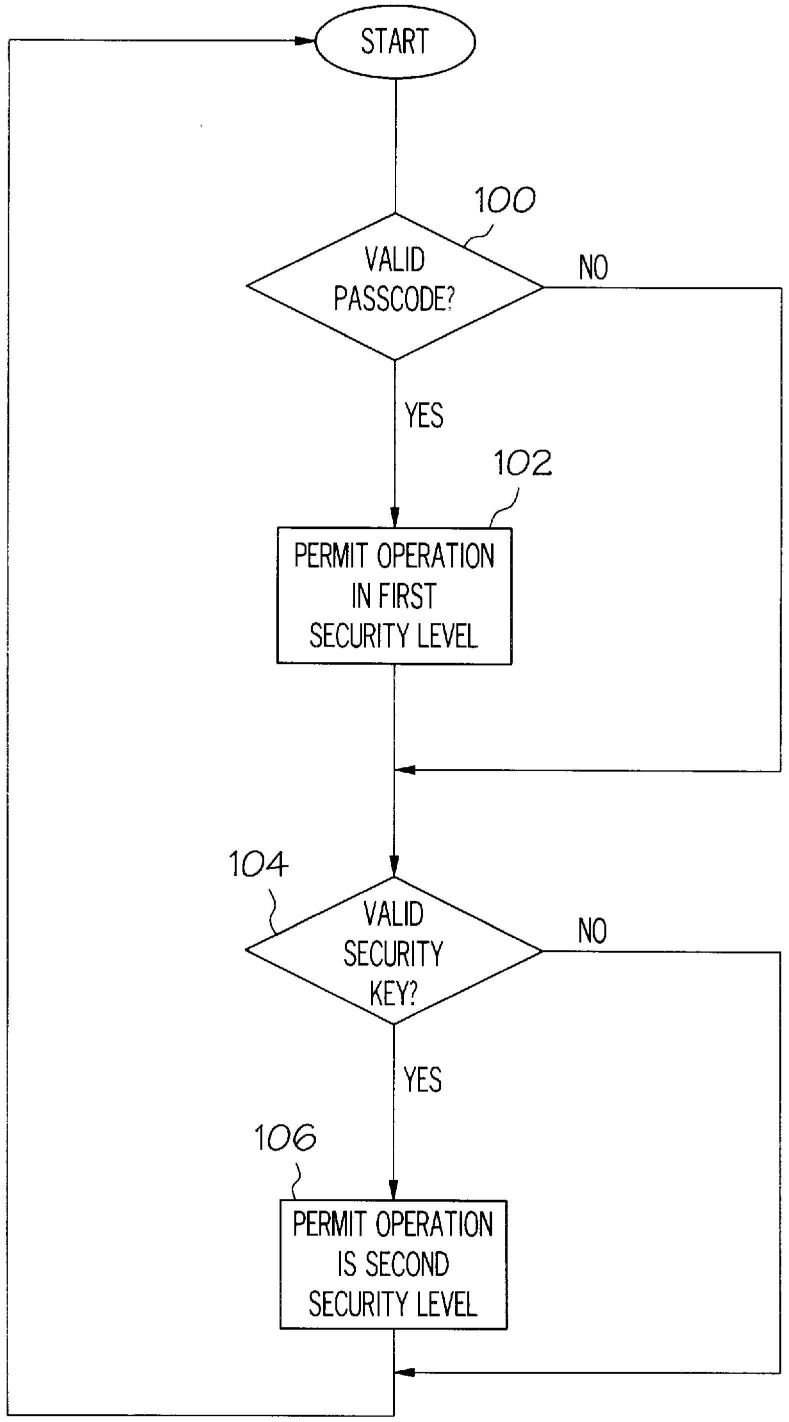
FIG. 3 is a flow chart illustrating a method of dispensing documents according to the present invention.

Entry into a first security level, or security mode, is dependent upon whether a valid passcode is entered at the passcode entry device 20 (see FIG. 3, steps 100 and 102). The passcode entry device 20 comprises a mechanical or electronic component, e.g. an electronic keypad, at which a predetermined security passcode is entered so as to complete a security level entry sequence by initiating a passcode verification sequence according to the operations programs resident in the dispenser controller 12. It is contemplated by the present invention that the passcode entry device 20 may comprise a keyboard, a keypad, any decoder capable of receiving and decoding a security passcode, including an audio signal decoder, or a set of mechanical switches capable of being arranged to correspond to a security passcode. As noted above, the first security level preferably corresponds to an operator mode, accessible only upon entry of an operator passcode, and utilized to designate specific information to be printed on the documents and to dispense the documents.

Entry into a second security level is dependent upon whether a valid security key is received at the security key receiver 22 (see FIG. 3, steps 104 and 106). The security key receiver 22 detects the presence of a valid transportable security key. The transportable security key comprises a mechanical key and the security key receiver 22 comprises a lock arrangement defining a key slot or key hole. Alternatively, the transportable security key may comprise a magnetically, electrically, optically, or mechanically encoded object and the security key receiver 22 may comprise an object reader or scanner. Finally, the transportable security key may comprise a visible or invisible electromagnetic radiation source and the security key receiver 22 may comprise a radiation detector. It is contemplated by the present invention that a plurality of security key receivers and corresponding transportable security keys may be provided to control access to more than one security level. The second security level, or the plurality of key accessible security levels, preferably correspond to executive mode functions and, for example, may be used to specify how the dispenser will operate, e.g., setting passwords, clearing system memory, selecting output types for document formats, printing document samples, setting various dispensing maximums, etc.

Figure 2:
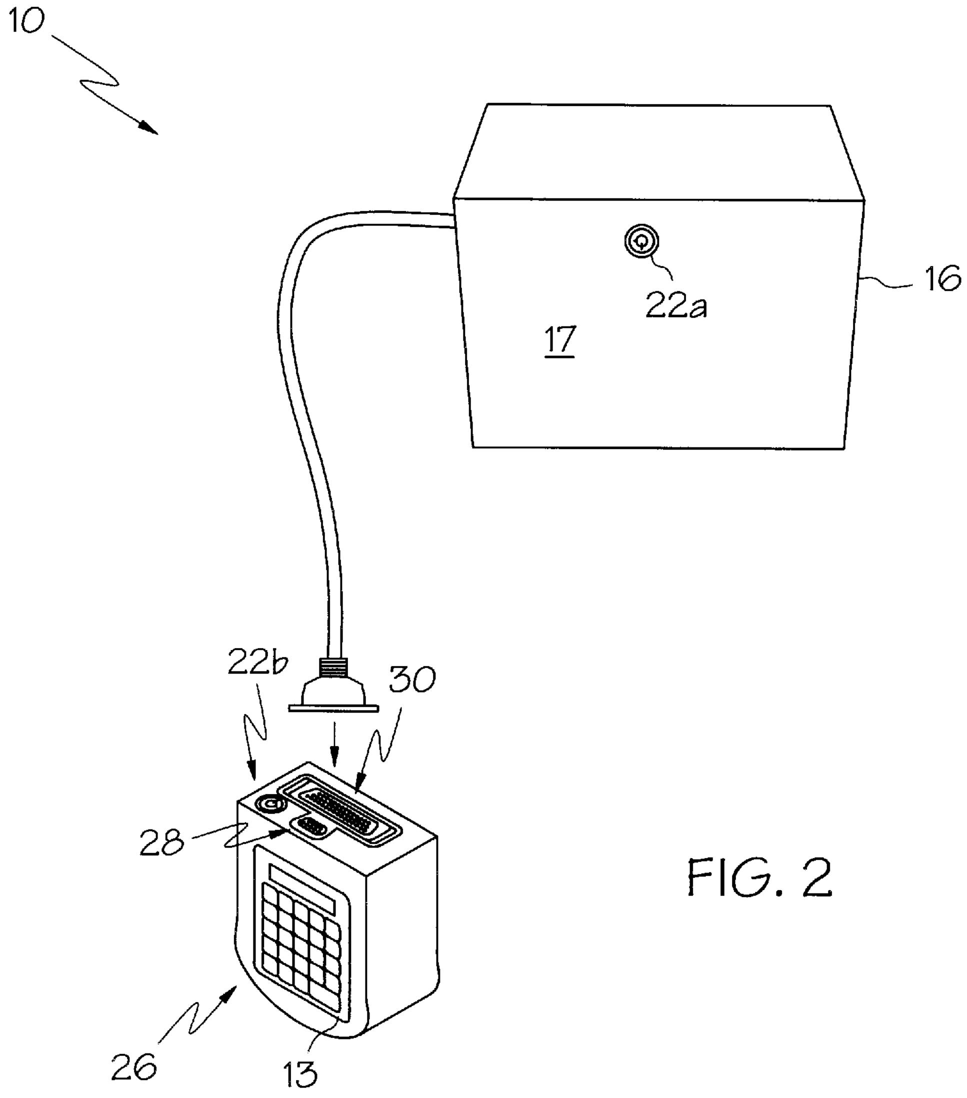
FIG. 2 is an illustration of document dispenser in accordance with a preferred embodiment of the present invention.

FIG. 2 shows a dispenser 10 including a printer 16 and a dispenser controller unit 26. The printer 16 includes a printer access panel 17 which is opened and closed to access the printer paper supply. It is contemplated by the present invention that the printer 16 may also be designed such that the printer door panel 17 may be opened and closed to access other printer mechanisms or compartments, e.g., printer controls, the printing mechanism, etc. The dispenser controller unit 26 incorporates the dispenser controller 12, the security controller 24, and a dispenser key pad 13 which functions as the document data input device 18 and the passcode entry device 20.

A first security receiver lock 22*a* is coupled to an access panel opening and closing mechanism of the printer 16 such that the lock has a dual function of initiating access to the low level security mode and permitting access to the printer paper supply compartment. A second security receiver lock 22*b* is present on the rear of the controller unit 26, as are a serial data input port 28 and a parallel data input port 30. It is contemplated by the present invention that the first security receiver lock 22*a* may alternatively be provided on the rear of the controller unit 26.

In the embodiment illustrated in FIG. 2, a dispenser operator mode is accessed by entering a valid first security passcode on the key pad 13, a low level executive mode is accessed by inserting a valid mechanical key in the first security receiver lock 22*a*, and a high level executive mode is accessed by inserting a valid mechanical key in the second security receiver lock 22*b*.

The security controller 24 is arranged to permit dispenser operation in a first security level when a valid passcode is entered at the passcode entry device 20, and to permit dispenser operation in a second security level when a valid transportable security key is detected by the security key receiver 22. The security controller 24 includes a memory device for storing a security level entry codes corresponding to the first security level and sends an operation signal output to the dispenser controller 12 indicative of whether operation in a particular security level is to be permitted or inhibited according to whether a valid security level entry code has been input at the passcode entry device 20. Specifically, the security controller 24 compares the operator passcode entered at the passcode entry device 20 to a value stored in memory. If the operator passcode is valid, operation in the first security mode is permitted by the security controller 24. Similarly, the security controller 24 monitors whether a valid transportable security key has been received at the security key receiver 22 and permits entry into the second security mode when the valid key is detected by sending an operation signal output to the dispenser controller 12. It is contemplated by the present invention that the first security level entry code may be stored in the security controller 24 or in another location accessible to the security controller 24, e.g., in the memory of the dispenser controller 12.

It is contemplated by the present invention that a variety of source codes may be utilized to enable operation of a document dispenser according to the present invention. It is also contemplated by the present invention that a personal computer coupled to a printer could be modified to form the components of the document dispenser described above. Listed in attached appendix A is an example of source code which enables dispenser operation in the operator mode when a valid operator passcode is entered at a passcode entry device, operation in a low level executive mode when the presence of a first valid transportable security key is detected by a security key receiver, and operation in a high level executive mode when the presence of a second valid transportable security key is detected by a second security key receiver.

Having described the invention in detail and by reference to preferred embodiments thereof, it will be apparent that modifications and variations are possible without departing from the scope of the invention defined in the appended claims.

APPENDIX A

Application of

| | | |
|---|---|---|
| Applicants | : | Philip G. LaDue,<br>Lance E. Kelly,<br>John H. King,<br>William V. Harrison |
| Serial No. | : | |
| Filed | : | December 31, 1997 |
| Title | : | DOCUMENT DISPENSER OPERATOR SECURITY |
| Docket | : | STD 616 PA |
| Examiner | : | |
| Art Unit | : | |

Legend:

HI_EXEC_KEY -
HIGH executive security key switch hardware line. Referenced as a binary or bit value and defined in 8032.H.

DOORSW -
Dispenser door switch hardware line. Referenced as a binary or bit value and defined in 8032.H.

HI_EXECENTRY -
A binary flag defined in 8032.C. Set/reset in timer0_isr of ISR.C and analyzed by the main processing loop of main() in file MAIN.C. If the HIGH executive security key has been turned to the ON position, timer0_isr() will set this flag to let the main processing loop that it may enter the high level executive mode.

LOW_EXECENTRY -
A binary flag defined in 8032.C. Set/reset in timer0_isr of ISR.C and analyzed by the main processing loop of main() in file MAIN.C. If the dispenser door has been opened, timer0_isr() will set this flag to let the main processing loop know that it may enter the low level executive mode.

EXIT_EXEC -
A binary flag defined in 8032.C. Set in timer0_isr() of ISR.C and analyzed by check_exec() in EXECPROC.C. This flag will be set if currently in the high level executive mode and the HIGH executive security key to turned to the "off" position. This flag will also be set if currently in the low level executive mode and the dispenser door is closed.

Main Processing Loop -
This is a piece of code located in main() of MAIN.C that will repetitively check for an event such as the HIGH executive security key to be turned to the "on" position or the dispenser door to be opened. This "loop" of code is executed while at the initial prompt.

timer0_isr() -

This is a routine in ISR.C. Invoked by the processor every 20 milliseconds, it will "poll" various hardware lines such as the door and security key switches for state changes and indicate to the current processing loop such as main () or check_exec() through binary flags (like the above mentioned).

```
/*****************************************************************************
*
*  8032.h -
*
*****************************************************************************
```

```
sfr   P0      = 0x80;      /* bit-addressable SFR space */
sfr   TCON    = 0x88;
sfr   P1      = 0x90;
sfr   SCON    = 0x98;
sfr   P2      = 0xA0;
sfr   IE      = 0xA8;
sfr   P3      = 0xB0;
sfr   IP      = 0xB8;
sfr   T2CON   = 0xC8;
sfr   PSW     = 0xD0;
sfr   ACC     = 0xE0;
sfr   B       = 0xF0;

                           /* other SFRs */
sfr   SP      = 0x81;
sfr   DPL     = 0x82;
sfr   DPH     = 0x83;
sfr   PCON    = 0x87;      /* for uart 19.2 k baud, set to 0x80 */
sfr   TMOD    = 0x89;
sfr   TL0     = 0x8A;
sfr   TL1     = 0x8B;
sfr   TH0     = 0x8C;
sfr   TH1     = 0x8D;
sfr   SBUF    = 0x99;
sfr   RCAP2L  = 0xCA;
sfr   RCAP2H  = 0xCB;
sfr   TL2     = 0xCC;
sfr   TH2     = 0xCD;

/*  8032 Bit-addressable locations 80 through FF     */

sbit  TF1     = 0x8F;      /* TCON bits */
sbit  TR1          = 0x8E;
sbit  TF0          = 0x8D;
sbit  TR0          = 0x8C;
sbit  IE1          = 0x8B;
sbit  IT1          = 0x8A;
sbit  IE0          = 0x89;
sbit  IT0          = 0x88;

sbit  SM0          = 0x9F;      /* SCON bits */
sbit  SM1          = 0x9E;
sbit  SM2          = 0x9D;
sbit  REN          = 0x9C;
sbit  TB8          = 0x9B;
sbit  RB8          = 0x9A;
sbit  TI      = 0x99;
sbit  RI      = 0x98;

                                /* P1 bits (all low true) */
sbit  RS232_DSR      = 0x97;    /* UART Data Set Ready */
sbit  RS232_CTS      = 0x96;    /* UART Clear To Send */
sbit  RS232_DTR      = 0x95;    /* UART Data Terminal Ready */
sbit  LOW_EXEC_KEY   = 0x94;
sbit  HI_EXEC_KEY    = 0x93;
sbit  DOORSW         = 0x92;    /* Door Switch or Flash Address 2 */
sbit  BANK1          = 0x91;    /* Flash Address 1 */
sbit  BANK0          = 0x90;    /* Flash Address 0 */
```

```
sbit  EA       = 0xAF;      /* IE bits */
sbit  ET2      = 0xAD;
sbit  ES       = 0xAC;
sbit  ET1          = 0xAB;
sbit  EX1          = 0xAA;
sbit  ET0          = 0xA9;
sbit  EX0          = 0xA8;

sbit  PT2          = 0xBD;      /* IP bits */
sbit  PS       = 0xBC;
sbit  PT1          = 0xBB;
sbit  PX1          = 0xBA;
sbit  PT0          = 0xB9;
sbit  PX0          = 0xB8;

sbit  RD         = 0xB7;      /* P3 bits */
sbit  WR         = 0xB6;
sbit  PFLASH     = 0xB5;
sbit  RS232_RTS  = 0xB4;      /* UART Request To Send */
sbit  INT1       = 0xB3;      /* printer acknowledge interrupt */
sbit  UARTMOD    = 0xB2;      /* uart mode */
sbit  TXD            = 0xB1;      /* lister transmit */
sbit  RXD            = 0xB0;      /* lister ready */

sbit  TF2           = 0xCF;      /* T2CON bits */
sbit  EXF2      = 0xCE;
sbit  RCLK      = 0xCD;
sbit  TCLK      = 0xCC;
sbit  EXEN2     = 0xCB;
sbit  TR2       = 0xCA;
sbit  T2        = 0xC9;
sbit  RL2           = 0xC8;

sbit  CY            = 0xD7;      /* PSW bits */
sbit  AC       = 0xD6;
sbit  F0       = 0xD5;      /* user flag 0 */
sbit  RS1      = 0xD4;
sbit  RS0      = 0xD3;
sbit  OV       = 0xD2;
sbit  F1       = 0xD1;      /* user flag 1 */
sbit  P             = 0xD0;

/*
 * The bit flags.  These values resided at bit locations 0x08 - 0x47
 * of the 4325...
 */

extern bit   TXRDY;       /* UART transmitter ready */
extern bit   PTRDY;       /* parallel printer ready */
extern bit   CONNECT;     /* Used to tell that char's are recv'd - assume connect
attempt */
extern bit   CKSUMERR;    /* check sum error in DNLOAD command */
extern bit   UPDNDOC;     /* Flag for upload / download untrans doc data */
extern bit   KBDOUTOVR;   /* keyboard output buffer overflowed */
extern bit   BINARY_COMM;/* Used to surpress CRLF translation */
extern bit   COMMOUTOVR;  /* comm output buffer overflowed */

extern bit   COMMACTIVE;  /* communication active */
extern bit   RS232COMM;   /* RS-232 communications */
extern bit   exit_win;      /* RS-232 exit window flag */
extern bit   AUTODIAL;      /* autodial active */
extern bit   BUTTON_SET;    /* flag for exec_key_access  */
extern bit   AUTOAN;      /* autoanswer active */
extern bit   MANUALDIAL;  /* operator manual dial */
extern bit   MANUALAN ;   /* operator manual answer */
```

```
extern bit    MODEMINIT;  /* modem initialized */

extern bit    COMM_CHANGED; /* Used to see if comm modes have changed since last i
nit */
extern bit    ALLCMD;      /* comm ALL command active */
extern bit    REMOTEDBG;   /* debug report out comm port */
extern bit    AUTODAILY;   /* do autodaily report */
extern bit    KEYPRESS;    /* key pressed */
extern bit    REDIAL;      /* in autodial redial period */

extern bit    AMEX;        /* AMEX machine */
extern bit    TRAVELERS;   /* TRAVELERS machine */
extern bit    TIMEOUT;     /* exec or op timeout has occurred */
extern bit    LOCKOUT;     /* in operator lockout period */
extern bit    LASTBLOCK;   /* last XMODEM block has been sent */
extern bit    VOIDED;      /* voided document */
extern bit    LOCKPROMPT;  /* at Comm Lock or Operator Lock prompt */
extern bit    DOOROPEN;    /* printer door open message status */

extern bit    KBDINFUL;    /* keyboard input buffer full */
extern bit    KBDINEMP;    /* keyboard input buffer empty */
extern bit    KBDOUTFUL;   /* keyboard output buffer full */
extern bit    KBDOUTEMP;   /* keyboard output buffer empty */
extern bit    COMMINFUL;   /* comm input buffer full */
extern bit    COMMINEMP;   /* comm input buffer empty */
extern bit    COMMOUTFUL;  /* comm output buffer full */
extern bit    COMMOUTEMP;  /* comm output buffer empty */

extern bit    PRINTER_ERROR;    /* printer error flag  */
extern bit    CONNECT_PENDING;  /* comm. state pending flag  */
extern bit    EXIT_EXEC;        /* hi level exec mode flag */
extern bit    JAM;
extern bit    EXEC_BUTTON;      /* executive button pressed flag  */
extern bit    HI_EXEC_BUTTON;   /* high executive button pressed flag  */
extern bit    HI_EXECENTRY;     /* timer 2 used as seconds timer */
extern bit    LOW_EXECENTRY;    /* timer 2 expired */

extern bit    SEQMENU;          /* indicates that currently in SN seq prompt */
extern bit    EXECENTRY;        /* exec mode entry flag */
extern bit    NEWPROM;          /* detected new (different) prom version */
extern bit    DOING_AUTODAILY;  /* Used to insure NO RECURSION */
extern bit    MEMERROR;         /* memory test error flag */
extern bit    DISABLEANS;       /* disable modem auto-answer mode */
extern bit    ENABLEANS;        /* enable modem auto-answer mode */
extern bit    ADDRESSESC;       /* ESC from Debugging Enter Address prompt */

extern bit    OPENOPLOCK;   /* open operator lockout window */
extern bit    OPLOCK_MODE;  /* check the printer status flag  */
extern bit    LISTER_TIMEOUT_FLAG; /* Used if waiting on user during lister timeou
t */
extern bit    CLEAR_MEM;    /* clear memory flag for set_dt_tm  */
extern bit    INIT_PROMPT;  /* initial prompt flag for [exec]  */
extern bit    FLSH_STAT;
extern bit    HI_KEY_SET;   /*  hi_exec_key_access set flag */
extern bit    TIME_PROMPT;  /* display time/date on bottom display line flag */


/******************************** END OF 8032.H ***************************/
```

```
/*****************************************************************************
*
*  8032.c -
*
*****************************************************************************
```

```
char bdata badd [8];

sbit   TXRDY        = badd[0] ^ 0;  /* UART transmitter ready */
sbit   PTRDY        = badd[0] ^ 1;  /* parallel printer ready */
sbit   CONNECT      = badd[0] ^ 2;  /* Used to tell chars recv'd - assume connect
attempt. */
sbit   CKSUMERR     = badd[0] ^ 3;  /* check sum error in DNLOAD command */
sbit   UPDNDOC      = badd[0] ^ 4;  /* Flag for upload / download untrans doc data
 */
sbit   KBDOUTOVR    = badd[0] ^ 5;  /* keyboard output buffer overflowed */
sbit   BINARY_COMM  = badd[0] ^ 6;  /* Used to surpress CRLF translation */
sbit   COMMOUTOVR   = badd[0] ^ 7;  /* comm output buffer overflowed */

sbit   COMMACTIVE   = badd[1] ^ 0;  /* communication active */
sbit   RS232COMM    = badd[1] ^ 1;  /* RS-232 communications */
sbit  exit_win     =  badd[1] ^ 2;  /*  RS232 exit window  */
sbit   AUTODIAL     = badd[1] ^ 3;  /* autodial active */
sbit   AUTOAN       = badd[1] ^ 4;  /* autoanswer active */
sbit   MANUALDIAL   = badd[1] ^ 5;  /* operator manual dial */
sbit   MANUALAN     = badd[1] ^ 6;  /* operator manual answer */
sbit   MODEMINIT    = badd[1] ^ 7;  /* modem initialized */

/* sbit    ???     = badd[2] ^ 0;  */
sbit   COMM_CHANGED = badd[2] ^ 1; /* Used to see if comm modes have changed sinc
e last init */
sbit   ALLCMD       = badd[2] ^ 2;  /* comm ALL command active */
sbit   REMOTEDBG    = badd[2] ^ 3;  /* debug report out comm port */
sbit   AUTODAILY    = badd[2] ^ 4;  /* do autodaily report */
sbit   BUTTON_SET   = badd[2] ^ 5;   /*  flag for exec_key_access  */
sbit   KEYPRESS     = badd[2] ^ 6;  /* key pressed */
sbit   REDIAL       = badd[2] ^ 7;  /* in autodial redial period */

sbit   AMEX         = badd[3] ^ 0;  /* AMEX machine */
sbit   TRAVELERS    = badd[3] ^ 1;  /* TRAVELERS machine */
sbit   TIMEOUT      = badd[3] ^ 2;  /* exec or op timeout has occurred */
sbit   LOCKOUT      = badd[3] ^ 3;  /* in operator lockout period */
sbit   LASTBLOCK    = badd[3] ^ 4;  /* last XMODEM block has been sent */
sbit   VOIDED       = badd[3] ^ 5;  /* voided document */
sbit   LOCKPROMPT   = badd[3] ^ 6;  /* at Comm Lock or Operator Lock prompt */
sbit   DOOROPEN     = badd[3] ^ 7;  /* printer door open message status */

sbit   KBDINFUL     = badd[4] ^ 0;  /* keyboard input buffer full */
sbit   KBDINEMP     = badd[4] ^ 1;  /* keyboard input buffer empty */
sbit   KBDOUTFUL    = badd[4] ^ 2;  /* keyboard output buffer full */
sbit   KBDOUTEMP    = badd[4] ^ 3;  /* keyboard output buffer empty */
sbit   COMMINFUL    = badd[4] ^ 4;  /* comm input buffer full */
sbit   COMMINEMP    = badd[4] ^ 5;  /* comm input buffer empty */
sbit   COMMOUTFUL   = badd[4] ^ 6;  /* comm output buffer full */
sbit   COMMOUTEMP   = badd[4] ^ 7;  /* comm output buffer empty */

sbit   PRINTER_ERROR   = badd[5] ^ 0;  /* printer error flag  */
sbit   CONNECT_PENDING = badd[5] ^ 1;  /* comm. state pending flag  */
sbit   EXIT_EXEC       = badd[5] ^ 2;  /* hi level exec mode flag */
sbit   JAM             = badd[5] ^ 3;
```

```
sbit   EXEC_BUTTON      = badd[5] ^ 4;  /* executive button pressed flag  */
sbit   HI_EXEC_BUTTON   = badd[5] ^ 5;  /* hi executive button pressed flag  */
sbit   HI_EXECENTRY     = badd[5] ^ 6;  /* hi level exec entry flag  */
sbit   LOW_EXECENTRY    = badd[5] ^ 7;  /* low level exec entry flag  */

sbit   SEQMENU       = badd[6] ^ 0;  /* indicates that currently in SN seq prompt *
/
sbit   EXECENTRY     = badd[6] ^ 1;  /* exec mode entry flag */
sbit   NEWPROM       = badd[6] ^ 2;  /* detected new (different) prom version */
sbit   DOING_AUTODAILY = badd[6] ^ 3;  /* Used to insure NO RECURSION */
sbit   MEMERROR      = badd[6] ^ 4;  /* memory test error flag */
sbit   DISABLEANS    = badd[6] ^ 5;  /* disable modem auto-answer mode */
sbit   ENABLEANS     = badd[6] ^ 6;  /* enable modem auto-answer mode */
sbit   ADDRESSESC    = badd[6] ^ 7;  /* ESC from Debugging Enter Address prompt */

sbit   OPENOPLOCK    = badd[7] ^ 0;  /* open operator lockout window */
sbit   OPLOCK_MODE   = badd[7] ^ 1;  /* check the printer status flag  */
sbit   LISTER_TIMEOUT_FLAG = badd[7] ^ 2; /* Used if waiting on user during liste
r timeout */
sbit   CLEAR_MEM     = badd[7] ^ 3;  /* clear memory flag for set_dt_tm  */
sbit   INIT_PROMPT   = badd[7] ^ 4;  /* initial prompt flag for [exec]  */
sbit   FLSH_STAT     = badd[7] ^ 5;
sbit   HI_KEY_SET    = badd[7] ^ 6;  /*  hi_exec_key_access set flag */
sbit   TIME_PROMPT   = badd[7] ^ 7;

/**************************** END OF 8032.C *********************************/
```

04/22/1996 11:47 Filename: MAIN.C Page 1

```
/*****************************************************************************
*
*  main.c -
*
******************************************************************************
```

```
#define IN_MAIN 1
#include "data.h"

#include "8032.h"
#include "io.h"
#include "constdat.h"
#include "struct.h"
#include "proto.h"

#include <absacc.h>
#include <stdio.h>
#include <string.h>
#include <stdlib.h>

/***********************************************************************/
void main(void)
{
   byte  key, key2, op_entry;
   char  d_str[21];
   char  tmp_str[3];
   byte  exec_was;  /* Hold last exec so we can post exiting messages */
   byte  hi_exit;

   EA = FALSE;     /*  disable all interrupts  */

   /* For serial number seq */
   seq_problem = NO;

   /*  For reporting (fix for NEW opt. 20... )   */
   op_smry_rpt = FALSE;

   /*  comm rec. id flags  */
   tbt_rec = max_rec = FALSE;

   /* Set time prompt before init, because it can print lister which may
   ** timeout */
   TIME_PROMPT = FALSE;
   time_change = TRUE;
   op_entry = FALSE;
```

```
   EXEC_BUTTON = HI_EXEC_BUTTON = EXIT_EXEC = FALSE;      /*  reset exit flag onl
y in main loop...  */

   init ();

   /**  The MAIN processing loop - Check for events and react...  **/
   for (;;)
   {
      /* If we are trying to come BACK into flash, then do it */

      if (CONNECT_PENDING || AUTOAN ||
         do_flag_control(&FLASH_CONTROL, FLASH_CONTROL_TO_FLASH, NULL_STR, FALSE)
 == ON)
      {
         TIME_PROMPT = FALSE;
         CONNECT = TRUE;
         CONNECT_PENDING = FALSE;

         /* If we are trying to come BACK into flash, then don't reinit */

         if (do_flag_control(&FLASH_CONTROL, FLASH_CONTROL_TO_FLASH, NULL_STR, FA
LSE) == ON)
         {
            /* Turn it off */
            do_flag_control(&FLASH_CONTROL, FLASH_CONTROL_TO_FLASH, OFF_ON[OFF],
FALSE);

            COMMACTIVE = TRUE;

            if (c_mode == RS232)
            {
               RS232COMM = TRUE;
            }
            else
            {
               RS232COMM = FALSE;
            }

            RS232COMM = TRUE;

            dial_type = 0;     /*  Comm. session initiated by auto-dial  */
            comm_task(RS232, 3, OPTION);
#ifdef POST_BETA
            comm_task(c_mode, c_baud_rate_index, OPTION);
#endif
         }
         else  /* Just plain old boring comm request ... ho hum ... */
         {
            dial_type = 0;     /*  Comm. session initiated by auto-dial  */
            comm_task(comm_mode, baud_rate_index, MAKE_CONNECTION);
         }

         CONNECT = FALSE;
         TIME_PROMPT = TRUE;
      }

      /* Special RECONNECT logic.
      ** If a dndoc or dnalldoc is not completed succesfully
      ** a reconnect will happen and keep happening until
      ** it does! */

      while (do_flag_control(&FLASH_CONTROL, FLASH_CONTROL_AUTO_RECONNECT_FLASH,
NULL_STR, FALSE) == ON)
      {
         TIME_PROMPT = FALSE;
         CONNECT = TRUE;
         CONNECT_PENDING = FALSE;
```

```
      dial_type = 0;    /*  Comm. session initiated by auto-dial  */
      comm_task(comm_mode, baud_rate_index, AUTO_RECONNECT);
   }




#ifdef   PRE_LAW
   while (mach_lock)
   {
      TIMEOUT = FALSE;
      clr_dsply00 (MACHINE_LOCK_STR);
      sprintf (d_str, "%c", mach_suffix);
      dsply_str0 (13, d_str);
      dsply_str10 (CALL_MONEY_ORDER_CO);
      key = get_key();
      if ((key == PHONE) || CONNECT_PENDING)
      {
         TIME_PROMPT = FALSE;
         CONNECT = TRUE;
         CONNECT_PENDING = FALSE;

         if (key == PHONE)
            op_comm();
         else
            comm_task(comm_mode, baud_rate_index, MAKE_CONNECTION);

         CONNECT = FALSE;
         TIME_PROMPT = TRUE;
      }
   }

   while (comm_lock)
   {
      TIME_PROMPT = FALSE;
      clr_dsply00 (COMMUNICATIONS_LOCK);
      key = get_key();
      if ((key == PHONE) || CONNECT_PENDING)
      {
         TIME_PROMPT = FALSE;
         CONNECT = TRUE;
         CONNECT_PENDING = FALSE;

         if (key == PHONE)
            op_comm();
         else
            comm_task(comm_mode, baud_rate_index, MAKE_CONNECTION);

         CONNECT = FALSE;
         TIME_PROMPT = TRUE;
      }
   }

   if (!HI_EXEC_KEY && (hi_exec_key_access == DISABLED) && !CONNECT)
   {
      TIME_PROMPT = FALSE;
      clr_dsply00 (EXECUTIVE_KEY_SWITCH);
      dsply_str10 (NOT_AVAILABLE);

      /*  wait on key switch to be returned to original position */
      while (!HI_EXEC_KEY && !CONNECT);

      TIME_PROMPT = TRUE;
```

```
        }

        if (!LOW_EXEC_KEY && (lo_exec_key_access == DISABLED) && !CONNECT)
        {
           TIME_PROMPT = FALSE;
           clr_dsply00 (EXECUTIVE_KEY_SWITCH);
           dsply_str10 (NOT_AVAILABLE);

           /*  wait on key switch to be returned to original position */
           while (!LOW_EXEC_KEY && !CONNECT);

           TIME_PROMPT = TRUE;
        }
#endif
/**

        if ((HI_EXECENTRY || LOW_EXECENTRY || EXEC_BUTTON || HI_EXEC_BUTTON)
              && !CONNECT_PENDING)
        {
           /* Must setup exec_was before trying to print audit message. */

           if (HI_EXECENTRY || HI_EXEC_BUTTON)
              exec_was = HIGH_SWITCH;
           else
           if (LOW_EXECENTRY || EXEC_BUTTON)
              exec_was = LOW_SWITCH;

           TIME_PROMPT = TIMEOUT = FALSE;

           exec_entry_audit(ENTERING_EXEC, exec_was);

           if (HI_EXECENTRY || HI_EXEC_BUTTON)
           {
              EXECMODE = HIGH;
              /*  reset key button access if high or both  */
              if (exec_key_access > 1)
                   exec_key_access = 0;
           }
           else
           if (LOW_EXECENTRY || EXEC_BUTTON)
           {
              EXECMODE = LOW;
              /*  reset key button access if low only  */
              if (exec_key_access == 1)
                   exec_key_access = 0;
           }

           /* Recheck, if turn key back off while in lister timeout then
           ** ENTRY's might not still be set. */

           if (EXECMODE != 0)
```

```
          {
             if (HI_EXEC_BUTTON)
             {
                hi_exit = TRUE;
             }
             else
                hi_exit = FALSE;

         /** make a call to check_exec in file EXECPROC.C to process
          ** the HIGH/LOW executive
          **/
             check_exec();
          }

          if (EXECMODE == HIGH)
          {
             /**
              **   If the high exec key was NOT enabled in the
              **   last high exec mode, then if Mid America, disable...
              **/
             if (!HI_KEY_SET)
             {
                if (is_SPECIAL_FUNCTION(MIDAMER))
                   hi_exec_key_access = DISABLED;
             }
          }

          if (hi_exit)
             HI_EXEC_BUTTON = FALSE;

          EXEC_BUTTON = EXIT_EXEC = FALSE;        /*  reset exit flag only in main l
oop...  */
          EXECMODE = 0;

          exec_entry_audit(EXITING_EXEC, exec_was);
       }

       time_change = TRUE;
       /*  Assume init prompt...  */
       disable_cur();

            /*
            ** if we have printed a report and are still waiting for a
            ** keypress to re-enable document pullback, display message
            ** and get a keypress (or event)
            */
            if (NEED_RPT_KEYPRESS) /* SDI #F96-004 */
            {
                   /* display report done message and wait for a key (or event) */

                   rpt_done_get_key();
            }

       if ((SEQ_EVENT_PENDING || SEQ_INTERRUPT_PENDING || RESET_ALIGN) && !CONNECT
_PENDING)
       {
          if (seq_verify)
          {
             TIME_PROMPT = FALSE;
             SEQ_EVENT_PENDING = FALSE;
             unretract_doc ();
             RESET_ALIGN = TRUE;
             if (!SEQ_INTERRUPT_PENDING)
                press_clear (DOOR_CLOSED);
             if (RESET_ALIGN)
             {
```

```
            SEQMENU = TRUE;    /* let ent_serno know to use SN seq. check digit
 */
            seq_get_sn();
            auto_void_last_3 ();
            SEQMENU = FALSE;
            RESET_ALIGN = FALSE;
            if (!CONNECT_PENDING && (HI_EXECENTRY == 0 && LOW_EXECENTRY == 0))
            {
               SEQ_INTERRUPT_PENDING = FALSE;
            }
         }
         time_change = TRUE;
      }
      else
      {
         TIME_PROMPT = FALSE;
         SEQ_EVENT_PENDING = FALSE;
         press_clear (DOOR_CLOSED);
      }
   }

   if (LOCKOUT)
   {
      TIME_PROMPT = FALSE;
      while ((HI_EXECENTRY == 0 && LOW_EXECENTRY == 0) && LOCKOUT &&
                 !CONNECT_PENDING && !SEQ_EVENT_PENDING)
      {
            clr_dsply00(OPERATOR_LOCK);

            key = get_key();

            /**
             **  A new Mid-America Special feature:
             **       Enable the Phone Key during an Operator Lock.
             **/

            if ((key == PHONE) || CONNECT_PENDING || AUTOAN)
            {
               CONNECT = TRUE;
               CONNECT_PENDING = FALSE;

               if (key == PHONE)
                  op_comm();
               else
                  comm_task(comm_mode, baud_rate_index, MAKE_CONNECTION);

               CONNECT = FALSE;
            }
#ifdef LAWSUIT
            /*  if the [exec] key has been pressed and the low exec button fla
g enabled...  */
            if ((key == EXEC) && (exec_key_access & 1))
               EXEC_BUTTON = TRUE;
#endif
         }
#ifdef LAWSUIT
      }
      else
      {
         while ((HI_EXECENTRY == 0 && LOW_EXECENTRY == 0) && !EXEC_BUTTON
                 && !AUTOAN && !CONNECT_PENDING && !SEQ_EVENT_PENDING && LOCK
OUT)
         {
            clr_dsply00(OPERATOR_LOCK);
```

```
                /*  if the [exec] key has been pressed and the low exec button fla
g enabled...    */
                if ((get_key() == EXEC) && (exec_key_access & 1))
                   EXEC_BUTTON = TRUE;
             }
          }
#endif

          TIME_PROMPT = TRUE;
          TIMEOUT = FALSE;
       }
       else
       {
          if ((HI_EXECENTRY == 0 && LOW_EXECENTRY == 0) && !HI_EXEC_BUTTON
                && !AUTOAN && !CONNECT_PENDING)
          {
             INIT_PROMPT = TRUE;
             key = 0;
             if (op_passcd_req)
                key = ent_op_passcd ();     /* go to op. pc prompt (w/TIMEOUT)  */

             else
                curr_op_id = 99;
             INIT_PROMPT = FALSE;
          }
       }

       if ( (key == ENTER) || (!op_passcd_req && !EXEC_BUTTON && !HI_EXEC_BUTTON))

       {
          if (op_passcd_req)
             op_entry = TRUE;
          else
             INIT_PROMPT = TRUE;     /*  set and check for [exec] key if no pc req
.  */

          op_time = op_time_out;     /*  reset for timeout  */

          key = op_proc ();
          OP_MODE = TRUE;
          INIT_PROMPT = FALSE;       /*  reset for [exec] in get_dsply_num  */
       }

       if (key == SERVICE)
       {
          key = TIME_PROMPT;  /* Save old value */
          TIME_PROMPT = FALSE;
          opt_29();
          TIME_PROMPT = key;  /* Restore prev value */
       }

       if (TIMEOUT)
       {
          TIMEOUT = FALSE;
          op_time = op_time_out;
          if (op_entry)
          {
             op_entry = FALSE;
             do
             {
                TIMEOUT = FALSE;
                press_clear (Operator_Time_Out);
             }
             while (TIMEOUT);
          }
```

```
        }

        op_entry = FALSE;
        TIMEOUT = FALSE;
        time_change = TRUE;
        auto_void_last_3 ();

    }  /* End of for ; ; */

}

/**************************** END OF MAIN.C ********************************/
```

```
/******************************************************************************
*
*  execproc.c -
*
******************************************************************************
*
* $Log:    R:/projs/electra/code/vcs/execproc.c_v  $
```

```
#include "const.h"
#include "constdat.h"
#include "struct.h"
#include "8032.h"
#include "io.h"
#include "data.h"
#include "proto.h"

#include <stdio.h>
#include <string.h>
#include <stdlib.h>

/* File scoped vars */
int  opt_cnt, opt_ptr;
char opt_key;
char opt_str[3];        /* WARNING : Leave this varibles up here ...
                        ** They are only used for check_exec() but since it can
                        ** call functions via function pointers, the Franklin
                        ** compile doesn't understand.  So ... during optimization
                        ** it will most likely assign one of the other "stack"
                        ** variable for the called routines to the same space.
                        */

                       ******************************************************

void check_exec(void)
{
   byte  inkey;

#ifdef   PRE_LAW
```

```
   pc_lockout = FALSE;     /*  reset op. pc. lockout flag after exec entry */
   cur_op_tries = 0;       /*  reset retry count  */
#endif

   HI_KEY_SET = FALSE;                /*  reset high exec key switch flag  */
   if (is_SPECIAL_FUNCTION(MIDAMER))
      hi_exec_key_access = DISABLED;
```

```
******************************************/
    current_pos = SETUP_POS_MINUS_1;
    get_option(FORWARD);     /*  get 1st avaliable opt */

    /* if there are no options available then report and return */
   if (current_pos == 100)
   {
       clr_dsply00 (No_Options_Available);
      if (EXEC_BUTTON)
      {
         while (!TIMEOUT && !HI_EXEC_BUTTON && (inkey != ESCAPE))
         {
            inkey = get_key();
            if ((inkey == EXEC) && exec_key_access >= 2)
               HI_EXEC_BUTTON = TRUE;

            if ((inkey == ESCAPE) && exec_key_access != 2)
               exec_key_access = 0;
         }
         EXEC_BUTTON = FALSE;
      }
      else
      {
         while (!EXIT_EXEC && !HI_EXEC_BUTTON)
         {
            if ((get_key() == EXEC) && (exec_key_access >= 2))
               HI_EXEC_BUTTON = TRUE;
         }
         if (EXIT_EXEC && (exec_key_access == 1))
               exec_key_access = 0;
      }
      return;
    }

    /*
    **  Process select executive option until an exit (escape) is
    **  received.
    */

    for ( ; ; )
    {
    /**  EXIT_EXEC is a 1 bit flag that is set in timer0_isr () of
     **  of file ISR.C.  If set then either the dispenser door has
     **  been closed or the HIGH EXEC security key has been turned to
     **  the off position.  In either case, exit check_exec().
```

```
        **/
          if (EXIT_EXEC)
              return;

        if (TIMEOUT)
        {
            EXEC_BUTTON = FALSE;
            exec_key_access = 0;
            return;
        }

          /* Display choice */
          clr_dsply00(Select_Option);
          clr_dsply_str10(exec[current_pos].dsply_opt);

          /** Remember! The last parameter in get_dsply_num must be a
           ** pointer to a null string so that the top line does not
           ** get written over...          **/

#ifdef    PRE_LAW
          /* Special - for non-numeric selection - like Setup */

          if ((int)(exec[current_pos].opt_num) == HIDDEN_MENU)
              opt_str[0] = '\0';
          else
              sprintf(opt_str, "%02d", (int)(exec[current_pos].opt_num));
#endif

          sprintf(opt_str, "%02d", (int)(exec[current_pos].opt_num));

        /*  if at setup menu item then do not display a number by item  */
        if (current_pos == SETUP_POS_MINUS_1)
            opt_str[0] = '\0';

          /* Valid keys:  Prev/Next Option, Esc, Enter, Clear, Numerics */
          opt_key = get_dsply_num(SCREEN_COLS, 2, 0x403F, opt_str, "");

          if (EXIT_EXEC)
              return;

          if (TIMEOUT)
          {
            exec_key_access = 0;
            EXEC_BUTTON = FALSE;
            return;
          }

        opt_ptr = atoi(opt_str);

        /*  don't allow them into any setup option if # was entered */
        if ((opt_ptr > SETUP_POS) && (num_pressed) && (opt_key == ENTER))
            opt_key = 0;

        switch (opt_key)
        {
            case ENTER:

                    /* Special - for non-numeric selection - like Setup */
                    if (opt_str[0] == '\0')
                    {
                        current_pos = SETUP_POS;  /* Set to first setup */

                        /* If we don't have access to first setup, then find the
                        ** one we do. */

                        if (EXECMODE == LOW && !low_flg[current_pos])
```

```
          {
             get_option(FORWARD);
          }
       }
       else
       {
          /* validate the entered option */
          for (opt_cnt = 0; opt_cnt < MAXOPTS; opt_cnt++)
          {
             if (opt_ptr == (int)exec[opt_cnt].opt_num)
             {
                if (EXECMODE == HIGH ||
                    (EXECMODE == LOW && low_flg[opt_cnt]))
                {
                   current_pos = opt_cnt;  /* Set the new cursor pos. */

                   (func[current_pos].routine)();

                   if (EXIT_EXEC)
                   {
                      if ((exec_key_access & 1) && (EXECMODE == LOW) &&
!BUTTON_SET)
                         exec_key_access = 0;
                     BUTTON_SET = FALSE;

                      return;
                  }

                   if (TIMEOUT)
                   {
                      EXEC_BUTTON = FALSE;
                     if (!BUTTON_SET)
                        exec_key_access = 0;
                     BUTTON_SET = FALSE;
                      return;
                   }

                   break;
                }
             }
          }  /* End for */

          if (opt_cnt > MAXOPTS)
          {
             prs_clr_invld_opt_no ();

             if (EXIT_EXEC && !EXEC_BUTTON)
             {
                if ((exec_key_access == 1) && (EXECMODE == LOW)
                      && !BUTTON_SET)
                   exec_key_access = 0;

                BUTTON_SET = FALSE;

                return;
            }

            if (TIMEOUT)
            {
               EXEC_BUTTON = FALSE;
               if (!BUTTON_SET)
                  exec_key_access = 0;

               BUTTON_SET = FALSE;
               return;
```

```
                    }
                  }
                } /* End if not setup */
                break;
            case ESCAPE :
                /* Note : " ... there is no escape" - well not from the exec
                ** options anyway. */
                /* Special - for non-numeric selection - like Setup */
                if (current_pos > (SETUP_POS_MINUS_1))
                {
                   current_pos = (SETUP_POS_MINUS_1);  /* Set the new cursor pos.
*/
                }
                else
                {
                   if (EXEC_BUTTON || HI_EXEC_BUTTON)
                   {
                      EXEC_BUTTON = FALSE;
                      if (((exec_key_access & 1) || HI_EXEC_BUTTON)
                            && !BUTTON_SET)
                         exec_key_access = 0;
                      BUTTON_SET = FALSE;
                      return;
                   }
                   current_pos = SETUP_POS_MINUS_1;
                   get_option(FORWARD);  /*  get 1st avaliable opt */
                }
                break;
            case EXEC:
                if ((EXECMODE == LOW) && HI_EXEC_BUTTON)
                   return;
            case PREV_OPTION :
                get_option(BACKWARD);
                break;
            case NEXT_OPTION :
                get_option(FORWARD);
                break;
        } /* End of switch */
    } /* end of for (;;)  */
}
/*************************************************************************
**
**     NAME            :    get_option
**
**
**
**     DESCRIPTION     :
**          This routine will return an index to the next or prior
**          valid executive option.
**
```

```
**      PARAMETERS          :
**          none
**
**      RETURNS             :
**          byte     -      current index of next/prior option
**                          (returns a 100 if option not found)
**
*************************************************************************/
void get_option (int direction)
{
    byte    opt_cnt = 0;

    while (++opt_cnt <= MAXOPTS)
    {
        if (direction == FORWARD)
        {
            ++current_pos;

            /* If going forward then check for wrap around */
            /* Options 1 - 8  */
            if (current_pos == SETUP_POS)
            {
                /*  if opts. 1-8 not available, remain at setup position (SETUP_P
OS)  */
                if ((opt_cnt != SETUP_POS) || low_flg[0])
                    current_pos = 0;        /* wrap around */
            }

            /* Options 20 - 99 wraparound back to 20 */
            if (current_pos == MAXOPTS)
                current_pos = SETUP_POS;
        }
        else
        {
            /* If going backward the check for wrap around */
            if (current_pos == 0)
                current_pos = SETUP_POS_MINUS_1;
            else
            {
                /* If next display is setup then backup to opt. 5 */
                if (--current_pos == SETUP_POS_MINUS_1)
                    current_pos = MAXOPTS_MINUS_1;
            }
        }

        /* If high level exec or low level and option enabled then valid */
        if (EXECMODE == 2 || low_flg[current_pos])
            return;

        /* If options 1 - 8 not available then skip to 20 - 99  */
        if ((current_pos == SETUP_POS_MINUS_1 - 1) && (opt_cnt == SETUP_POS_MINUS
_1))
            current_pos = SETUP_POS_MINUS_1;
    }

    /* Return an error indicating that
    ** a valid option was not found */
    current pos = 100;
}

/*************************************************************************/
void prs_clr_invld_opt_no(void)
{

   press_clear (Invalid_Option_No);
}
```

```
/**************************** END OF EXECPROC.C *************************/
```

```
/*****************************************************************************
 *
 *  isr.c - Interrupt Service Routines
 *
 *****************************************************************************
 *
 * $Log:   R:/projs/electra/code/vcs/isr.c_v  $
 *
 */

#include "8032.h"
#include "io.h"
#include "data.h"
#include "proto.h"


/*****************************************************************************
 *  void read_rtc()
 *
 *  Reads rtc time, date and day. Updates "curr_date". This function is only
 *  called by init() and the 20 ms isr.
 *****************************************************************************/
void read_rtc(void)
{
    byte  mask_hrs;

    /* HRS is from 1 <-> 12 with pm id'ed as 0x8? */

    mask_hrs = HRS & 0x7F;
    if ( (mask_hrs > 0) && (mask_hrs < 13) && (MINS < 60) )
    {
        if (mask_hrs == 12)
            mask_hrs = 0;

        if (HRS & 0x80)
            mask_hrs += 12;

        /* clk_time is number of minutes since midnight */
```

```
        curr_date.clk_time = ((int)(mask_hrs * 60)) + (int)MINS;
    }
    else
        curr_date.clk_time = 0; /*  set time to 0 if not currently valid  */

    /*  set 1st byte of the date string to NULL to assume an invalid date  */
    curr_date.clk_date[0] = (byte)0;
    if ( MONTH && (MONTH < 13)
        && DOM && (DOM < 32)
          && (YEAR < 100)
             && DOW && (DOW < 8) )
    {
        curr_date.clk_date[0] = MONTH;
        curr_date.clk_date[1] = DOM;
        curr_date.clk_date[2] = YEAR;
        curr_date.dow = DOW - 1;
    }
}

/**********************************************************************
 **
 **      NAME               :   set_prt_date
 **
 **********************************************************************/
void set_rpt_date(void)
{

/* Don't use strcpy because this can be called by timer0 and strcpy
** is not reentrant.
**    strncpy(rpt_date.clk_date, curr_date.clk_date, 3);
*/
    rpt_date.clk_date[0] = curr_date.clk_date[0];
    rpt_date.clk_date[1] = curr_date.clk_date[1];
    rpt_date.clk_date[2] = curr_date.clk_date[2];
    rpt_date.dow = curr_date.dow;
    rpt_date.clk_time = curr_date.clk_time;
}

/**********************************************************************
 *  void timer0_isr()
 *
 *  Timer 0 interrupt service routine. This is the 20 ms system timer.
 **********************************************************************/
void timer0_isr (void) interrupt 1
{
    int    crnt_min_cnt;
    byte   tmp_byte;

    TR0 = FALSE;                    /* disable timer */

    scan_kbd();

    if (delay_cnt)
        --delay_cnt;

    /* LEAVE THIS TEST AT > 0; This way timer will never set to zero and
    ** some other logic keys off of negative TIMER. */

    if (TIMER1 > 0)
        --TIMER1;

    /* LEAVE THIS TEST AT > 0; This way timer will never set to zero and
    ** some other logic keys off of negative TIMER. */

    if (TIMER2 > 0)
```

```
    --TIMER2;

  if (--blink_cnt == 0)
  {
    blink_change = TRUE;
    blink_cnt = 50;
  }

  /* Added as part of startup from garbage RAM case.  Basically until the
  ** global vars can get init'ed, do not try to use them for other
  ** logic.  This was screwing-up on 'very first' power-up cases. */
  if (NEWPROM)
  {
    TH0 = TIMER0_HI;            /* 20 ms timer value */
    TL0 = TIMER0_LO;
    TR0 = TRUE;                 /* enable timer */
    return;
  }

  /*  check the door switch  */
  if (DOORSW)    /*  door closed?  */
  {
    /**
     **  DOOROPEN is used to determine if a door state change
     **  has occurred.  Once the door is opened, post a flag to print
     **  "door open" message.  Once the door is closed (after being opened),
     **  post a flag for serial number sequencing if valid.
     **/
    if (DOOROPEN_PENDING)
    {
      DOORCLOSED = TRUE;
    }
  }
  else
  {
    /**
     **  THE DOOR IS OPEN...
     **/
    DOOROPEN_PENDING = TRUE;
  }


  /**
   **  HI Exec processing...
   **/
  if (HI_EXECENTRY)
  {
    /*  REMEMBER: exec keys are active low!  */
    if (HI_EXEC_KEY)
    {
      HI_EXECENTRY = FALSE;

    /**
     **  Currently in the HIGH level executive mode but the HIGH exec
     **  security key has been turned to the OFF position as indicated
     **  by the hardware line HI_EXEC_KEY now set (to 1 or HIGH),
     **  set the EXIT_EXEC bit flag to indicate to check_exec () of file
     **  EXECPROC.C that it must stop high level executive mode processing
     **  and exit back to the MAIN processing loop.
     **/
      if ((EXECMODE == 2) && !HI_EXEC_BUTTON)
        EXIT_EXEC = TRUE;
    }
  }
  else
  /**
```

```
 ** Currently NOT in the HIGH exec mode then check the security key:
 ** HI_EXEC_KEY. If this hardware line is low (or 0) then the HIGH exec
 ** security key has been turned to the ON position. This routine will
 ** set a 1 bit flag HI_EXECENTRY to communicate to the MAIN processing
 ** loop that the HIGH exec security key has been turned to the on position.
 **/
{
   /* REMEMBER: exec keys are active low! */
   if (!HI_EXEC_KEY || HI_EXEC_BUTTON)
   {
      HI_EXECENTRY = TRUE;
      if (AUTOAN)
      {
         exit_win = TRUE;
         CONNECT_PENDING = FALSE;
      }
   }
}

/**
 ** LOW Exec processing...
 **/
if (LOW_EXECENTRY)
{
   /* REMEMBER: exec keys are active low! */
   if (DOORSW)
   {
      LOW_EXECENTRY = FALSE;

   /**
    ** Currently in the LOW level executive but the dispenser door
    ** has been closed as indicated by DOORSW been set to 1 (or HIGH),
    ** set the EXIT_EXEC bit flag to indicate to check_exec () of file
    ** EXECPROC.C that it must stop low level executive mode processing
    ** and exit back to the MAIN processing loop.
    **/
      if (EXECMODE == 1)
         EXIT_EXEC = TRUE;
   }
}
else
{
/**
 ** Currently NOT in the LOW level executive mode, check the door
 ** switch line: DOORSW. If this hardware line is low (or 0),
 ** this routine will set the bit flag: LOW_EXECENTRY to indicate
 ** to the MAIN processing loop that the dispenser door has been opened.
 **/
   if (!DOORSW)
   {
      LOW_EXECENTRY = TRUE;
      if (AUTOAN)
      {
         exit_win = TRUE;
         CONNECT_PENDING = FALSE;
      }
   }
}

/* Has a minute elapsed? */
if (last_mins != MINS)
{
   last_mins = MINS;
   time_change = TRUE;

   /* update the current minute count */
```

```
    read_rtc();
    crnt_min_cnt = curr_date.clk_time;

#ifdef   PRE_LAW
    if (auto_ans)
    {

      /* If 'round-the-clock' */
      if (auto_ans_beg == auto_ans_end)
      {
        if (auto_ans_days[curr_date.dow])
          AUTOAN = TRUE;
        else
          AUTOAN = FALSE;

      }
      else
      if (auto_ans_beg < auto_ans_end)
      {
        if (crnt_min_cnt >= auto_ans_beg &&
            crnt_min_cnt < auto_ans_end)
        {
          if (auto_ans_days[curr_date.dow])
            AUTOAN = TRUE;
          else
            AUTOAN = FALSE;
        }
        else
          AUTOAN = FALSE;

      }
      else  /* Must be a roll-over midnight case */
      {
        if (!(crnt_min_cnt >= auto_ans_end &&
              crnt_min_cnt < auto_ans_beg))
        {
          /* Set yesterday */
          if (curr_date.dow == DOW_SUNDAY)
            tmp_byte = DOW_SATURDAY;
          else
            tmp_byte = curr_date.dow - 1;

          /* If we are allowed to set it for current date OR if
          ** we are on the other side of midnight of window and were
          ** allowed yesterday, then finish-out the window. */

          if (auto_ans_days[curr_date.dow] ||
            (crnt_min_cnt < auto_ans_end && auto_ans_days[tmp_byte]))
          {
            AUTOAN = TRUE;
          }
          else
            AUTOAN = FALSE;

        }
        else
          AUTOAN = FALSE;

      }
    }
    else
      AUTOAN = FALSE;
#endif

    if (auto_dial)
    {
```

```
        /*  if AUTOAN is set here then we are in RS232 answer window  */
        if (AUTOAN)
           exit_win = TRUE;
        else
           exit_win = FALSE;

        if (comm_mode == RS232)
           AUTOAN = TRUE;

        /* If 'round-the-clock' */
        if (auto_dial_beg == auto_dial_end)
        {
           ;  /*  ignore - no dial out....  */
              if (AUTODIAL)
                AUTODIAL = CONNECT_PENDING = AUTODIAL_DONE = FALSE;
              AUTOAN = FALSE;

#ifdef   PRE_LAW

           if (auto_dial_days[curr_date.dow] && !AUTODIAL_DONE)
           {
              if (!AUTOAN)
              {
                 AUTODIAL = CONNECT_PENDING = TRUE;
                 AUTODIAL_DONE = FALSE;  /* This would constantly dial ??? */
              }
           }
           else  /* outside setup window(s) */
           {
              if (AUTODIAL)
                 AUTODIAL = CONNECT_PENDING = AUTODIAL_DONE = FALSE;
              AUTOAN = FALSE;
           }
#endif

        }
        else
        if (auto_dial_beg < auto_dial_end)
        {
           if (crnt_min_cnt >= auto_dial_beg &&
                crnt_min_cnt < auto_dial_end)
           {
              if (auto_dial_days[curr_date.dow])
              {
                 exit_win = FALSE;     /*  still inside window so don't exit */
                 if (!AUTOAN)
                 {
                    if (!AUTODIAL_DONE)
                       AUTODIAL = CONNECT_PENDING = TRUE;
                 }
              }
              else  /* Outside setup window(s) */
              {
                 if (AUTODIAL)
                    AUTODIAL = CONNECT_PENDING = AUTODIAL_DONE = FALSE;
                 AUTOAN = FALSE;
              }
           }
           else  /* If outside window, clear out dial done for next time */
           {
              AUTODIAL_DONE = FALSE;
              AUTOAN = FALSE;
           }
        }
        else  /* Must be a roll-over midnight case */
        {
```

```
        if (!(crnt_min_cnt >= auto_dial_end &&
              crnt_min_cnt < auto_dial_beg))
        {
           /* Set yesterday */
           if (curr_date.dow == DOW_SUNDAY)
              tmp_byte == DOW_SATURDAY;
           else
              tmp_byte = curr_date.dow - 1;

           /* If we are allowed to set it for current date OR if
           ** we are on the other side of midnight of window and were
           ** allowed yesterday, then finish-out the window. */

           if (auto_dial_days[curr_date.dow] ||
               (crnt_min_cnt < auto_dial_end && auto_dial_days[tmp_byte]))
           {
              exit_win = FALSE;
              if (!AUTOAN)
              {
                 if (!AUTODIAL_DONE)
                    AUTODIAL = CONNECT_PENDING = TRUE;
              }
           }
           else  /* Outside setup window(s) */
           {
              if (AUTODIAL)
                 AUTODIAL = CONNECT_PENDING = AUTODIAL_DONE = FALSE;
              AUTOAN = FALSE;
           }
        }
        else  /* If outside window, clear out dial done for next time */
        {
           AUTODIAL_DONE = FALSE;
           AUTOAN = FALSE;
        }
     }
  }
  else  /* Outside setup window(s) */
  {
     if (AUTODIAL)
        AUTODIAL = CONNECT_PENDING = AUTODIAL_DONE = FALSE;
     AUTOAN = FALSE;
  }

  /* To prevent stacking lock on top of lock - don't even look for
  ** operator lock if other lock is already activated. */

  if (!mach_lock && !comm_lock)
  {

     if (op_lock_out)
     {
        LOCKOUT = FALSE;

        /* If 'round-the-clock' */
        if (op_lock_out_beg == op_lock_out_end)
        {
           LOCKOUT = TRUE;
        }
        else
        if (op_lock_out_beg < op_lock_out_end)
        {
           if (crnt_min_cnt >= op_lock_out_beg &&
               crnt_min_cnt < op_lock_out_end)
           {
              LOCKOUT = TRUE;
```

```
            }
          }
          else  /* Must be a roll-over midnight case */
          {
             if (!(crnt_min_cnt >= op_lock_out_end &&
                   crnt_min_cnt < op_lock_out_beg))
             {
                LOCKOUT = TRUE;
             }
          }
       }

       /*  Operator timeout ONLY! */
       if (KEYPRESS)
       {
          KEYPRESS = FALSE;
          TIMEOUT = FALSE;
          op_time = op_time_out;
          exec_time = ex_time_out;
       }
       else
       {
          if (!LOW_EXECENTRY && !HI_EXECENTRY && !CONNECT && !LOCKOUT)
          {
             if (op_time_out && (--op_time == (byte)0))
                TIMEOUT = TRUE;
          }
       }

    }  /* End of if not machine or comm lock */

    /* We'll process close-outs if in machine lock but NOT if in
    ** a comm lock. */

    if (!comm_lock)
    {
       if (auto_close)
       {
          if (auto_dly_days[curr_date.dow] && (crnt_min_cnt == auto_dly_time))
          {
             set_rpt_date();
             AUTODAILY = TRUE;
          }
       }
    }  /* End of if not comm lock */


 }  /*  end of: (last_min != MIN)  */


 TH0 = TIMER0_HI;              /* 20 ms timer value */
 TL0 = TIMER0_LO;
 TR0 = TRUE;                   /* enable timer */
}

/****************************************************************************
 *  void printer_isr()
 *
 *  Parallel printer acknowledge (external interrupt 1) interrupt service
 *  routine.
 ****************************************************************************/
void printer_isr(void) interrupt 2
{

 PTRDY = TRUE;
}
```

```
/****************************************************************************
 *  void timer1_isr()
 *
 *  Timer 1 interrupt service routine. This isr is not used, since T1 is the
 *  auto-reloading baud rate generator for the UART.
 ****************************************************************************/
void timer1_isr(void) interrupt 3
{
    ;
}

/****************************************************************************
 *  void uart_isr()
 *
 *  On-chip UART serial transmit interrupt service routine.
 ****************************************************************************/
void uart_isr(void) interrupt 4
{

  if (TI)
  {
     TI = FALSE;
     TXRDY = TRUE;
  }

  if (RI)
  {
     RI = FALSE;

     /*
     ** If we are allowed to do comm - then set flag to tell main loop
     ** that a char has come in.
     */
     if ((int)SBUF == (int)(RING_STATUS + '0') &&
         (RS232COMM || MANUALAN))
     {
        CONNECT_PENDING = TRUE;
     }

     uart_put_char(SBUF);

  }

}

/****************************************************************************
 *  void timer2_isr()
 *
 *  Timer 2 interrupt service routine. This timer is used as a multiple of
 *  50 ms.
 ****************************************************************************/
void timer2_isr(void) interrupt 5
{
  ;
}

/****************************************************************************
 *  void scan_kbd()
 *
 *  Scan the keyboard columns for a key depression, ignoring all other keys
 *  until release.
 *
 ****************************************************************************/
void scan_kbd()
{
```

```
   byte  key;

   if ( (key = (KB_COL_0 & 0x1F)) != 0x1F)
      check_kbd_state (key, 0);
   else
      prev_pressed[0] = FALSE;

   if ( (key = (KB_COL_1 & 0x1F)) != 0x1F)
      check_kbd_state ((key |= 0x20), 1);
   else
      prev_pressed[1] = FALSE;

   if ( (key = (KB_COL_2 & 0x1F)) != 0x1F)
      check_kbd_state ((key |= 0x40), 2);
   else
      prev_pressed[2] = FALSE;

   if ( (key = (KB_COL_3 & 0x1F)) != 0x1F)
      check_kbd_state ((key |= 0x60), 3);
   else
      prev_pressed[3] = FALSE;

   if ( (key = (KB_COL_4 & 0x1F)) != 0x1F)
      check_kbd_state ((key |= 0x80), 4);
   else
      prev_pressed[4] = FALSE;

}

/*************************************************************************/
void check_kbd_state (byte key, byte column)
{

   if (prev_pressed[column] == FALSE)
   {
      put_kbd_char (key);
      prev_pressed[column] = TRUE;
   }
}

/*****************************************************************************
 *  void uart_put_char(char)
 *
 *  Called by the uart interrupt routine to put a
 *  character into uart buffer if it is not full, otherwise
 *  character is dumped.
 *****************************************************************************/
void uart_put_char(char c)
{
    if ( !COMMOUTFUL )
    {
       *uart_buf.outp++ = c;
       COMMOUTEMP = FALSE;

       /* Check for wrap-around on ring-buffer */

       if (uart_buf.outp == uart_buf_tail)
          uart_buf.outp = uart_buf.buffer;

       if (uart_buf.inp == uart_buf.outp)
          COMMOUTFUL = TRUE;
    }
    else
    {
       /* Since comm was alreay FULL and tried to put another char.
       ** Set Overrun flag.  */
```

```
      COMMOUTOVR = TRUE;
    }
}
/****************************** END OF ISR.C *****************************/
```

What is claimed is:

1. A document dispenser comprising:

a dispenser controller programmed to control the operation of the document dispenser;

a document printer in communication with said dispenser controller;

a document data input device in communication with said dispenser controller;

a passcode entry device in communication with said dispenser controller;

at least one security key receiver in communication with said dispenser controller and arranged to detect the presence of a valid physically transportable security key;

a security controller in communication with said dispenser controller, arranged to control electronic access to a first security level by permitting dispenser operation in said first security level when a valid passcode is entered at said passcode entry device, and arranged to control electronic access to a second security level by permitting dispenser operation in said second security level when said valid physically transportable security key is detected by said security key receiver.

2. A document dispenser as claimed in claim 1, wherein said document data input device comprises a dispenser keyboard.

3. A document dispenser as claimed in claim 1, wherein said document data input device comprises a data input port.

4. A document dispenser as claimed in claim 1, wherein said passcode entry device comprises a keyboard.

5. A document dispenser as claimed in claim 1, wherein said passcode entry device comprises a keypad.

6. A document dispenser as claimed in claim 1, wherein said passcode entry device comprises a decoder arranged to receive said valid passcode.

7. A document dispenser as claimed in claim 1, wherein said physically transportable security key comprises a mechanical key and said at least one security key receiver comprises a lock arrangement defining a key slot or key hole.

8. A document dispenser as claimed in claim 1, wherein said at least one security key receiver comprises a first security key receiver and a second security key receiver, and wherein said first security key receiver is coupled to an access panel opening and closing mechanism of said printer.

9. A document dispenser as claimed in claim 1, wherein said at least one security key receiver is coupled to an access panel opening and closing mechanism of said printer.

10. A document dispenser comprising:

a dispenser controller programmed to control the operation of the document dispenser;

a document printer in communication with said dispenser controller;

a document data input device in communication with said dispenser controller;

a passcode entry device in communication with said dispenser controller;

a first security key receiver in communication with said dispenser controller and arranged to detect the presence of a first physically transportable security key;

a second security key receiver in communication with said dispenser controller and arranged to detect the presence of a second physically transportable security key;

a security controller in communication with said dispenser controller, arranged to control electronic access to a first security level by permitting dispenser operation in said first security level when said first physically transportable security key is detected by said security key receiver, arranged to control electronic access to a second security level by permitting dispenser operation in said second security level when said second physically transportable security key is detected by said security key receiver, and arranged to permit dispenser operation in a third security level when a valid passcode is entered at said passcode entry device.

11. A document dispenser as claimed in claim 10, wherein said first security key receiver is coupled to an access panel opening and closing mechanism of said printer.

12. A method of dispensing documents comprising the steps of:

providing a dispenser controller programmed to control the operation of a document printer and a document data input device;

controlling electronic access to a first security level by permitting dispenser operation in said first security level when a valid passcode is entered at a passcode entry device, and controlling electronic access to a second security level by permitting dispenser operation in said second security level when a valid physically transportable security key is detected by a security key receiver.

13. A document dispenser comprising:

means for controlling the operation of a document printer and a document data input device;

means for controlling electronic access to a first security level by permitting operation of said document printer and said document data input device in said first security level when a valid passcode is entered at a passcode entry device, and controlling electronic access to a second security level by permitting operation of said document printer and said document data input device in said second security level when a first valid physically transportable security key is detected by a first security key receiver.

14. A document dispenser as claimed in claim 13 further comprising means for controlling electronic access to a third security level by permitting operation of said document printer and said document data input device in said third security level when a second valid physically transportable security key is detected by a second security key receiver.

15. A document dispenser comprising:

a dispenser controller programmed to control the operation of the document dispenser;

a document printer in communication with said dispenser controller;

a document data input device in communication with said dispenser controller;

a passcode entry device in communication with said dispenser controller;

at least one security key receiver in communication with said dispenser controller and arranged to detect the presence of a valid transportable security key, wherein said transportable security key comprises a magnetically, electrically, optically, or mechanically encoded object and said at least one security key receiver comprises an object reader or scanner;

a security controller in communication with said dispenser controller, arranged to permit dispenser operation in a first security level when a valid passcode is entered at said passcode entry device, and arranged to permit dispenser operation in a second security level when said valid transportable security key is detected by said security key receiver.

16. A document dispenser comprising:

a dispenser controller programmed to control the operation of the document dispenser;

a document printer in communication with said dispenser controller;

a document data input device in communication with said dispenser controller;

a passcode entry device in communication with said dispenser controller;

at least one security key receiver in communication with said dispenser controller and arranged to detect the presence of a valid transportable security key, wherein said transportable security key comprises a visible or invisible electromagnetic radiation source and said at least one security key receiver comprises a radiation detector;

a security controller in communication with said dispenser controller, arranged to permit dispenser operation in a first security level when a valid passcode is entered at said passcode entry device, and arranged to permit dispenser operation in a second security level when said valid transportable security key is detected by said security key receiver.

* * * * *